May 14, 1946.  F. ERNST  2,400,109

PISTON RING

Filed Oct. 28, 1938

INVENTOR
FRED ERNST
BY John Flam
ATTORNEY

Patented May 14, 1946

2,400,109

UNITED STATES PATENT OFFICE 2,400,109

PISTON RING

Fred Ernst, Inglewood, Calif., assignor to Guy H. Hall, Los Angeles, Calif.

Application October 28, 1938, Serial No. 237,502

8 Claims. (Cl. 309—45)

This invention relates to piston rings for internal combustion engines. It is common to provide resilient rings in annular grooves formed in the piston to effect a seal for the cylinder space defined by the piston, and to ensure against leakage past the piston.

Usually one or more compression rings are arranged adjacent the end of the piston, to effect the main seal; and there is at least one oil ring below the compression rings which has apertures so arranged so as to pass lubricant from the exterior of the piston to the interior, thus ensuring adequate lubrication without undue burning or combustion of the lubricant.

It has been found however that the apertures through the oil ring in time become clogged due to deposition of carbon thereon; the efficiency of the oil ring to circulate the oil is consequently lessened. It is one of the objects of this invention to make it possible to maintain these oil ring apertures clear.

Where oil is at rest in the cylinder it tends to carbonize. By the aid of the present invention the oil is kept moving.

This effect is obtained by utilizing a supplemental ring, having relative movement with respect to the apertures. This ring, which may be termed a scavenger ring, thus acts to prevent any appreciable deposition of carbon in the apertures or adjacent their edges. It is accordingly another object of this invention to provide a scavenger ring capable of accomplishing these desirable functions. The ring also eliminates "sled runner" effects which may be caused by surfaces overlaid with deposited carbon on the edge of the ring.

This invention possesses many other advantages, and has other objects which may be made more easily apparent from a consideration of several embodiments of the invention. For this purpose there are shown a few forms in the drawing accompanying and forming part of the present specification. These forms, which illustrate the general principles of the invention, will now be described in detail; but it is to be understood that this detailed description is not to be taken in a limiting sense, since the scope of the invention is best defined by the appended claims.

Referring to the drawing.

Figure 5:
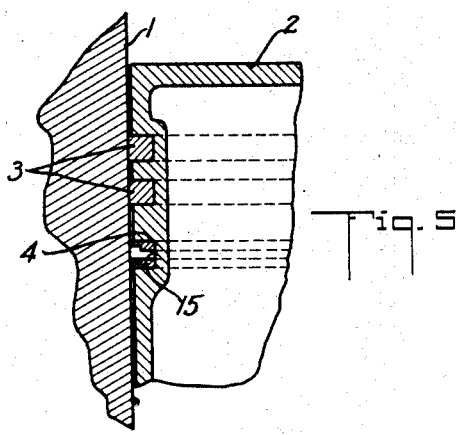
Fig. 5 is a fragmentary sectional view showing an oil ring incorporating the invention in use on a piston.

In Fig. 5 the cylinder wall 1 is indicated in which a piston 2 is slidable. The cylinder 1 and piston 2 may represent a part of an internal combustion engine.

As is common, the piston 2 carries near its upper end one or more compresion rings 3 for sealing the cylinder chamber. Below the compression rings 3 there is indicated an oil ring structure 4 disposed in a groove or annular recess 15 in the periphery of the piston 2.

Figures 1, 3:
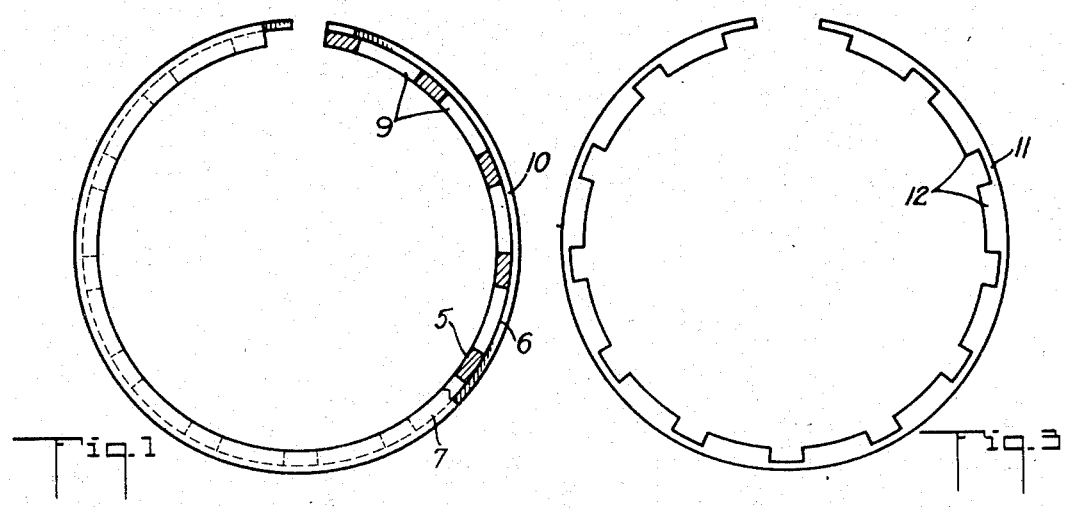
Figure 1 is a top plan view, partly broken away, of an oil ring incorporating the invention.
Fig. 3 is a top plan view of a modified form of scavenger ring that may be utilized in the oil ring structure.
Figure 2:
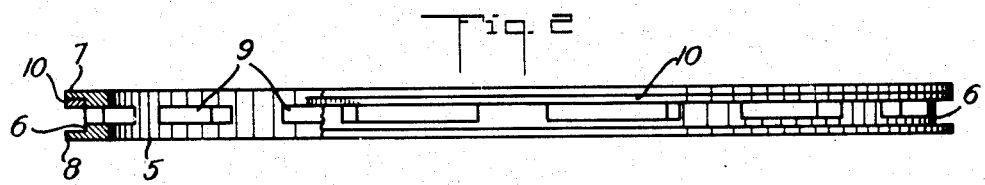
Fig. 2 is an elevation, partly broken away, of the oil ring shown in Fig. 1, the scavenger ring being shown in its uppermost position.
Figure 4:
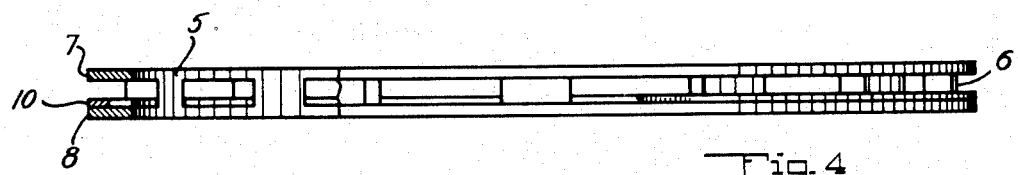
Fig. 4 is an elevation partly broken away of an oil ring similar to that shown in Fig. 1, but illustrating the scavenger ring of Fig. 3, said scavenger ring being in its lowermost position adjacent the lower flange of the oil ring.

The oil ring structure is shown to best advantage in Figs. 1, 2 and 4. In these figures it is seen that the oil ring 5 which may be made from resilient material, is provided with an annular recess 6 extending between the upper flange 7 and lower flange 8. In order to provide passages for the oil through the oil ring 5 a plurality of inwardly extending apertures 9 is provided. These apertures extend from the recess 6 inwardly and through the oil ring 4 so as to communicate with appropriately formed apertures in the skirt of the hollow piston 2.

In use, oil or lubricant is intended to be circulated through the apertures 9, as the piston 2 reciprocates within the cylinder 1. In time, these passages 9 may become clogged with a deposition of carbon. In order to minimize this deposition, use is made of a supplemental ring 10 of resilient material and having free ends. This ring serves also as a scavenger ring and is disposed between the flanges 7 and 8 and may be made of thin metal of the order of fifteen to twenty thousandths of an inch. The recess 6 being wider, the scavenger ring 10 can move between flanges 7 and 8. When the piston is moved downwardly, sufficient friction or inertia is present due to the resiliency of the ring 10 against the wall 1 of the cylinder, to cause this ring 10 to abut the upper flange 7 as illustrated in Fig. 2. However, when the piston 2 is reversed so as to move upwardly, the scavenger ring is caused by friction or inertia against the cylinder wall 1 to assume the position of Fig. 4. There is thus a relative scavenging movement between the ring 10 and the apertures 9 extending into the recess. This scavenging action operates somewhat as a scraping action to keep the contiguous surface of the recess 6 clean. Also intermittent contact against upper and lower surfaces of said recess 6, acts to dislodge any deposited carbon. The ring 10 thus moves across the apertures 9 during the scavenging action.

Should it be desired to ensure still more against the clogging of the apertures 9, the scavenger ring may be provided with inwardly directed projections engaging within the apertures 9. Such a scavenger ring 11 is illustrated in Fig. 3. In this form of the invention the inwardly directed projections 12 are intended to operate within the apertures 9.

Since the ring 10 or 11 is resilient, it can readily be sprung into place in the oil ring structure.

What is claimed is:

1. An oil ring having apertures extending through the ring, and a supplemental ring adjacent the exterior periphery of that portion of the oil ring through which the apertures extend, said supplemental ring having inwardly directed projections entering into said apertures.

2. An oil ring having an annular recess, the bottom of the recess having apertures extending from inside to the outside of the ring, and a supplemental ring in the recess and less in thickness than the width of the recess, said supplemental ring having inwardly directed projections entering into said apertures.

3. An oil ring having an annular recess, and a resilient ring tending to expand, located in the recess and less in thickness than the width of the recess, said oil ring having apertures extending inwardly from the recess, and said resilient ring having inwardly directed projections entering into said apertures.

4. An oil ring having an annular recess formed by spaced flanges, as well as apertures extending through the ring and between the flanges, and a supplemental ring located between the flanges and having a thickness substantially less than the space between the flanges, and having freedom of axial motion limited by said flanges.

5. An oil ring having an annular recess formed by spaced flanges, as well as apertures extending through the ring and between the flanges, and a supplemental ring located between the flanges and having a thickness substantially less than the space between the flanges, said scavenger ring having an inner edge and being capable of relative axial movement limited by the flanges so as to move said inner edge across said apertures.

6. An oil ring having an annular recess formed by spaced flanges, as well as apertures extending through the ring and between the flanges, and a supplemental ring located between the flanges, said supplemental ring having an inner edge provided with projections entering into the apertures and capable of relative movement between the flanges.

7. A piston ring having an annular recess formed by axially spaced flange surfaces, there being one or more apertures through the ring and opening into the annular recess, and a supplemental ring in the recess of a width substantially less than the width between said flanges and free to move axially between the flanges, the movement of the supplemental ring being at least sufficient to correspond substantially with the width of said apertures.

8. A two-piece oil-control ring comprising an annular ring member having a generally continuous uniform channel along its outer periphery, oil-draining passageways leading from said channel to the inner periphery of said ring member, and a second annular ring member of an axial width substantially less than the axial width of said channel floating loosely inside said channel and adapted to reciprocate axially to and fro therein, with the side walls of said channel limiting the relative axial movements of said floating ring member.

FRED ERNST.